Dec. 7, 1965 C. M. PERKINS 3,222,013
AUTOMATIC PILOTS FOR AIRCRAFT
Filed Dec. 14, 1955 5 Sheets-Sheet 4

FIG. 3A

INVENTOR.
CORLES M. PERKINS
BY Gordon Reed
ATTORNEY

United States Patent Office 3,222,013
Patented Dec. 7, 1965

3,222,013
AUTOMATIC PILOTS FOR AIRCRAFT
Corles M. Perkins, Anoka, Minn., assignor to Honeywell Inc., a corporation of Delaware
Filed Dec. 14, 1955, Ser. No. 553,131
25 Claims. (Cl. 244—77)

This invention relates to control systems for automatically maintaining one or more conditions with manually operable selective means for varying the condtions to be maintained. The control system chosen to embody the invention is an automatic pilot for aircraft for controlling the aircraft about its vertical, longitudinal, and lateral axes.

An object of the invention is to effect manually operable selective changes in conditions such as attitudes about the aircraft axes being automatically maintained by an automatic pilot for an aircraft and during such manually selected changes similar techniques are employed that are utilized when direct manual control of the craft condition changing devices or control surfaces is employed.

A further object of this invention is to utilize angular rate sensing devices such as rate gyroscopes to assist in stabilizing the craft about said axes and to compensate for crosscoupling effects on an angular rate responsive gyroscope, due to changes in angular position of the craft about a second of its axes resulting from operation of the manually operable selective means.

A further object of the invention is to complete a maneuver about an axis of the craft, which maneuver was initiated manually, by automatic control introduced when the craft attained a predetermined attitude about said axis.

A further object of this invention is to complete a maneuver automatically about the craft roll axis, which maneuver was initiated manually, when the craft attained a predetermined attitude about said axis on return movement of said manually operable selective means to unoperated position.

A further object of the invention is to stabilize the craft in heading by controlling its attitude about one of its axes through a signal generating device and utilizing this same signal device to introduce flight path control signals for changing the craft position relative to a chosen ground track.

A further object of the invention is to provide a signal device having a part selectively movable relative to the craft but which part is fixed relative to the craft during heading stabilization, said part being movable during radio beam control of the craft course.

A further object of the invention is to control the craft to a flight path having a position relative to the earth and wherein a modification of a signal from one of said angular rate devices is effected to avoid a condition of instability in control of the craft.

A further object of the invention is to utilize a roll attitude displacement responsive device as a controller during banked turns of the craft and disabling said attitude device from exerting any control when the roll attitude of the craft reaches a maximum predetermined angle.

A further object of the invention is to provide in said automatic pilot balanceable networks responsive to said angular rate devices and to provide novel means for automatically balancing said networks prior to the application of automatic pilot control, to avoid sudden operation of attitude controlling devices when automatic control is initiated.

A further object of the invention is to provide novel means to prevent the application of automatic control to the attitude control devices until such networks are balanced.

The above and other objects of the invention not as yet more particularly enumerated will become clear from a consideration of the following description had in conjunction with the accompanying drawings wherein.

The invention as stated is embodied in an automatic pilot of an aircraft, having three control channels, one for controlling the roll attitude of the craft, a second controlling the craft attitude about its vertical axis, and the third controlling the pitch attitude of the craft. Each channel includes an attitude control means or control surface that may be directly manually positioned or may be alternatively positioned by a servomotor. In turn, the servomotor may be controlled by an automatic pilot or may be manually controlled. During manual control of the servomotor, that results in the operation of a control surface the same techniques broadly are employed that are utilized when performing direct manual positioning of the attitude changing means. Since direct manual positioning of the attitude changing means or control surface will change craft attitude, the automatic pilot is adjusted or trimmed to such attitude through novel means so that upon application of autopilot control, the autopilot will not be commanding a sudden operation of a control surface. Heading stabilization or heading command is effected through a pickoff controlled by a heading error detecting device, but when on manually initiated changes in heading either through direct manual surface operation or manual control of the servo, the pickoff may be utilized to control motor means to null the pickoff. Signals from such pickoff during heading stabilization control the roll and turn channels related to the craft roll and vertical axes. Changes in pitch attitude during automatic stabilization are damped by a rate gyroscope. Flight path control of heading from a radio responsive means may supplement heading stabilization by operating a part of the pickoff in response to such radio signals that determine craft position relative to a chosen ground track. During heading control, a vertical gyroscope limits the bank angle to the heading command signal, but at high bank angles, the vertical gyroscope is rendered ineffective. While flight path control such as beam guidance control is applied to the craft roll attitude and vertical attitude channels of the autopilot to control heading, flight path control such as altitude control along with glide path control may be utilized in the pitch channel of the automatic pilot. To prevent instability due to phase lags while under altitude control if the pitch rate gyroscope signal is opposed to flight path command signals such as from the altitude controller, such gyroscope signals are modified by a lagging device to remove the instability. During banked turns as stated, when the pitch rate gyroscope responds to an apparent pitch up attitude rate, compensation means provide an effect to offset such pitch rate gyroscope response.

A detailed description of the embodiment of the invention in an autopilot which was applied to the control of the ailerons, rudder, and elevator surfaces of an aircraft will be made with reference to the accompanying drawings.

Figure 1A:
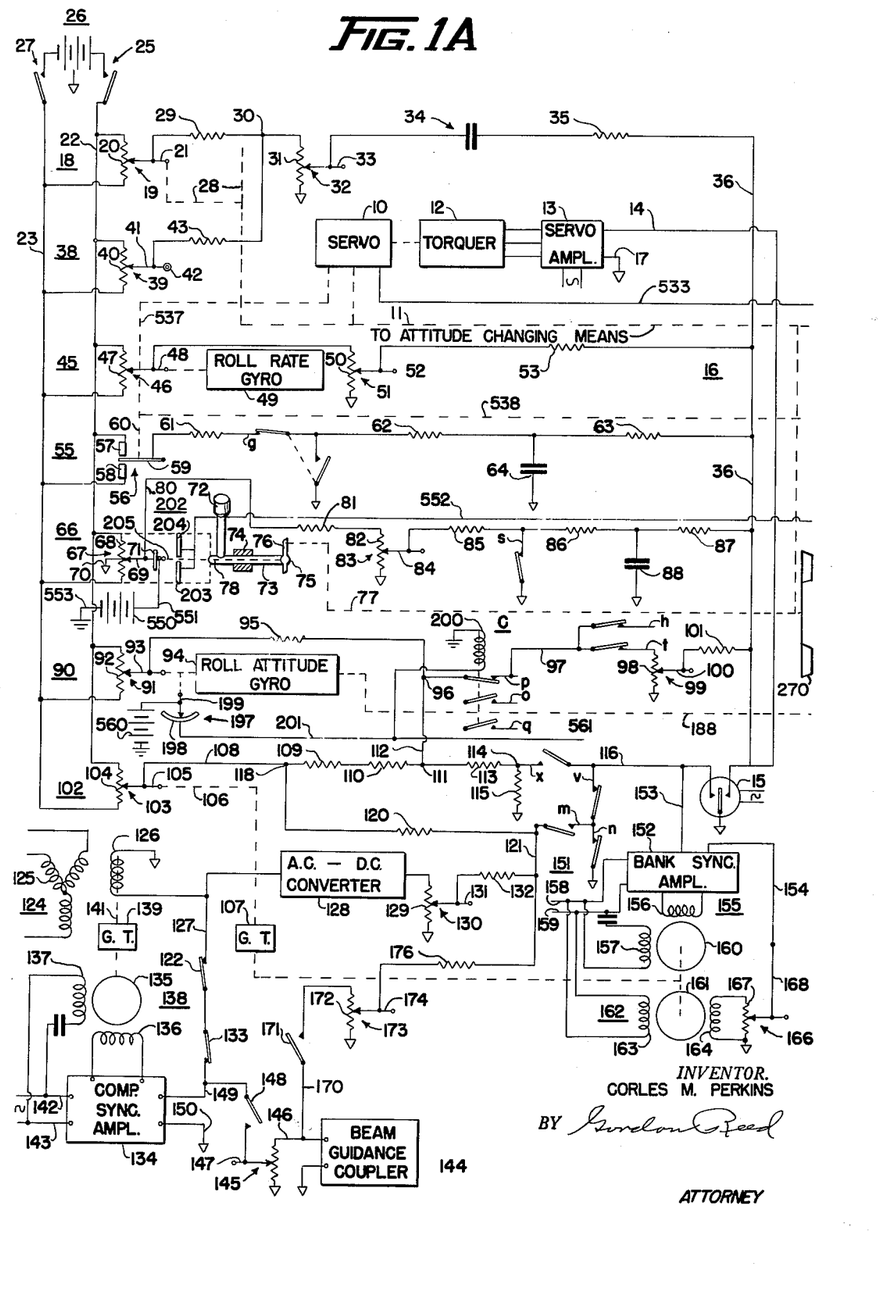
FIGURES 1A and 1B together comprise a diagram of the aileron channel of a three-channel automatic pilot showing various devices for providing control signals.

Referring to FIGURE 1A, a servomotor 10, to be described in detail hereinafter, operates through a suitable operating connection 11 roll attitude changing means such as aileron surfaces (not shown) of an aircraft. The servomotor 10 includes a control valve which is positioned by a torque motor 12. The torque motor 12 positions the valve in one direction or another in accordance with the output of a servo amplifier 13 to be hereinafter described. The servo amplifier is of the A.C. discriminator type and includes signal input conductors 14, 17 for receiving A.C. control signals on its control electrodes. Additionally, the servo amplifier is connected to an A.C. power supply. The direction of operation of the control valve of servo 10 depends upon the phase relationship between the A.C. voltage across conductors 14, 17 with respect to that from the A.C. supply. A.C. command or control signals are supplied to amplifier 13 from a D.C. to A.C. converter 15. The converter may be of the double-acting type and one side thereof receives D.C. input signals from a balanceable D.C. signal network 16 through a summing conductor 36 connecting the network to the converter 15.

Network 16 is a balanceable, parallel summing, D.C. signal network and comprises a follow-up signal generator 18, a trim signal generator 38, a roll rate signal generator 45, a pre-engage trim signal generator 55, a control stick steering signal generator 66, a roll attitude signal generator 90, and a bank synchronizer signal generator 102 which functions in network 16 as a heading stabilizer signal generator, a bank synchronizer signal generator, or a combined heading and localizer integration signal generator.

Signal generator 18 comprises a follow-up potentiometer 19 having a resistor 20 and a slider 21. One end of resistor 20 is connected to a D.C. supply conductor 22 and the opposite end of resistor 20 is connected to a second D.C. supply conductor 23. Conductor 22 is connected through a single pole switch 25 to one side of a D.C. voltage supply such as a battery 26 having a center tap connected to signal ground ($\nabla$). Conductor 23 is connected through a single pole switch 27 to the opposite side of D.C. supply 26. Slider 21 is positioned in either direction along resistor 20 from a normal position by a suitable operating means 28 extending from the operating means 11 for the aileron surfaces. A protective resistor 29 connects slider 21 to a terminal 30. One end of a resistor 31 of a voltage dividing potentiometer 32 is connected to terminal 30 the opposite end of the resistor being connected to signal ground. Potentiometer 32 includes an adjustable tap 33. A capacitor 34 and summing resistor 35 connected in series extend between tap 33 and summing conductor 36.

Trim signal generator 38 comprises a trim potentiometer 39 having a resistor 40 connected across conductors 22, 23 and a slider 41 positioned along resistor 40 through an operable means such as a knob 42. A resistor 43 connects slider 41 with terminal 30.

Signal generator 45 comprises a roll rate potentiometer 46 having a resistor 47 connected across conductors 22, 23 and a slider 48. Slider 48 may be positioned in either direction along resistor 47 by a roll rate gyroscope 49 of conventional type. The slider 48 is displaced from a normal position on resistor 47 in accordance with the rate of roll or banking rate of the craft. A resistor 50 of a voltage dividing potentiometer 51 has one end connected to slider 48, the opposite end of the resistor is connected to signal ground. The voltage dividing potentiometer 51 includes an adjustable tap 52. A summing resistor 53 connects tap 52 with summing conductor 36.

Pre-engage signal generator 55 comprises a switch 56 having spaced contacts 57, 58 and an adjustable contactor 59 normally centered on the space between the contacts 57, 58. Contact 57 is energized from conductor 22 and contact 58 is energized from conductor 23 to develop a fixed signal between each contact and signal ground but of one polarity or the other. Contactor 59 is operated by a suitable operating means 60 extending from a trim motor 457 in servo 10, to be described. Contactor 59 is connected to summing conductor 36 through series connected elements comprising resistor 61, an out contact $g$ of an engage relay A, to be described, a resistor 62, and a second resistor 63. The junction of resistors 62 and 63 is connected to signal ground through a capacitor 64. The opposite end of resistor 62 is connected to signal ground through a normally open or in contact of the engage relay A.

Signal generator 66 comprises a control stick steering operated potentiometer 67 having a resistor 68 connected across conductors 22, 23 and an adjustable slider 69 displaced in either direction from a grounded center tap 70 of resistor 68. Slider 69 is displaced from center tap 70 in proportion to the force applied to a conventional control column 72 of the aircraft which may be utilized alternatively to position the aileron control surfaces directly. To deflect slider 69 in proportion to the force applied to controller 72, the controller 72 is mounted on a resilient or torque tube 73 a distance axially displaced from a hub 75 from which extends an arm 76. The tube 73 is mounted in a suitable bearing support 74. The tube 73 supports the resistor 68 of the potentiometer whereas the slider 69 is supported on a spindle 78 mounted at one end to the hub 75 interiorly and concentric with the tube 73. An insulated member 71 electrically isolates slider 69 from the spindle 78. The arm 76 is connected through suitable operating means 77 to the aileron actuating means 11. It is thus evident that any resistance to the displacement of the aileron surfaces upon application of force to controller 72 will result in the relative deflection of the slider 69 relative to the center tap 70 of resistor 68. A conductor 80 connects slider 69 to one end of a resistor 81, the opposite end of resistor 81 connects with one end of resistor 82 of a voltage dividing potentiometer 83. The opposite end of resistor 82 is connected to signal ground. Potentiometer 83 includes an adjustable tap 84. Tap 84 is connected to summing conductor 36 through three series connected resistors 85, 86, and 87. The junction of resistors 86 and 87 is connected to signal ground through a capacitor 88. The junction of resistors 85 and 86 is connected to signal ground through a normally closed contact $s$ of a control stick steering relay E to be described.

Roll attitude signal generator 90 comprises a potentiometer 91 having a resistor 92 connected to supply conductors 22, 23 and an adjustable slider 93 positioned along resistor 92 in either direction from the approximate center thereof. The slider 93 is positioned by a roll attitude gyroscope 94 of conventional type. The gyroscope 94 is of the displacement type and positions slider 93 from its normal position a distance and direction dependent upon the change in bank attitude of the craft. A resistor 95 connects slider 93 with a terminal 96. For the purpose of stabilizing the craft about its roll or longitudinal axis a stabilizing signal is taken directly from terminal 96 to conductor 36. To this end, terminal 96 is connected through an in contact $p$ of a relay C (to be described), a conductor 97, an out contact $t$ of the control stick steering relay E, and through a voltage dividing potentiometer 99 and a summing resistor 101 to conductor 36. The potentiometer 99 comprises a resistor 98 having one end connected to signal ground and its opposite end connected to contact $t$. The potentiometer 99 includes an adjustable tap 100. One end of resistor 101 is connected to tap 100, the opposite end being connected to conductor 36. The normally closed contact $t$ is shunted by a normally closed contact or out contact $h$ of the engage relay A.

When on control stick steering mode, contact $t$ is opened, and the roll attitude signal at terminal 96 is supplied through a conductor 112 to a terminal 111. In this mode, the bank attitude signal at terminal 111 is repeated by a bank synchronizer 151 in a manner to be described.

Signal generator 102 comprises a bank synchronizing potentiometer 103 having a resistor 104 connected across conductors 22, 23 and an adjustable slider 105. The slider 105 is positioned in either direction along resistor 104 from a normal position through an operating means 106 extending from a gear train 107 driven by a bank synchronizer amplifier motor 155. In the control stick steering mode, signals from potentiometer slider 105 are transmitted over conductor 108, resistor 109, resistor 110 in series to terminal 111. From terminal 111 both the synchronizer potentiometer signals and the roll attitude signals from potentiometer 91 are transmitted through a resistor 113, an in contact $x$ of the control stick steering relay E to a D.C. to A.C. converter 15. The output from the one side of the D.C. to A.C. converter 15 is supplied over input conductor 153 to a bank synchronizer amplifier 152 which controls motor 155.

Heading stabilizing signals and combined radio derived and heading responsive control signals are derived from a synchro 124 in the form of a control transformer having a three phase stator winding 125 and a single phase rotor winding 126. The windings 125 are energized from a conventional and known gyrosyn compass or fluxgate compass (not shown). The signal developed in winding 126 varies with the relative direction of the gyroscope and craft during heading stabilization. During heading stabilization, the A.C. signal in rotor 126 is supplied to an A.C.-D.C. converter 128. The output from the converter is supplied to one end of a resistor 129 of a voltage dividing potentiometer 130; the opposite end of resistor 129 is connected to signal ground. Potentiometer 130 includes an adjustable tap 131 which is connected through a summing resistor 132 to a bank synchronizing control summing conductor 121.

Before heading stabilization is applied and also before the autopilot is engaged with the aircraft control surfaces, the output from the rotor winding 126 is supplied through a closed single pole single throw switch 122 and single pole single throw switch 133 to an input conductor 149 of a compass synchronizing amplifier 134. The amplifier 134 is of the A.C. discriminator type and in addition to the one input conductor 149 includes a second input conductor 150. Across these conductors A.C. input control signals are supplied. The amplifier 134 is also connected to A.C. power supply conductors 142, 143 energized from an alternating voltage source. The output of the amplifier 134 energizes one winding 136 of a capacitor type induction motor 138. Motor 138 has its other winding 137 energized from the A.C. voltage supply. The motor 138 includes a rotor 135 which operates through a gear train 139 and output shaft 141 to position rotor winding 126 so that it may be placed in a null position.

With the single pole single throw switch 122 opened as in heading stabilization, the signal from rotor winding 126 is supplied to the converter 128 and to the summing conductor 121. In the heading stabilizing mode with control from the gyrosyn compass (not shown) and synchro 124, the heading signal is applied from summing conductor 121 through and in contact $m$ of a heading engage relay B, an out contact $v$, and a conductor 116 to the D.C. to A.C. converter 15. The output from the converter is supplied through conductor 153 to the bank synchronizer amplifier 152. The bank synchronizer amplifier 152 is of the A.C. discriminator type having signal input conductors 153, 154 and A.C. voltage power supply conductors 158, 159. The output of the amplifier energizes one winding 156 of the bank synchronizer motor 155. The motor 155 is of the capacitor-induction type, and its other winding 157 is energized from conductors 158, 159 through a phasing capacitor. The motor 155 includes a rotor 160 which drives a rotor 161 of a velocity signal generator 162. The signal generator 162 includes a primary winding 163 energized from A.C. power conductors 158, 159 and a secondary 164 having a voltage generated therein in accordance with the rotational speed of rotor 161. The output of winding 164 is applied across a resistor 167 of a voltage divider 166. One end of resistor 167 is connected to signal ground. The voltage divider 166 includes an adjustable tap which is connected through conductor 168 to input conductor 154 of amplifier 152. The bank synchronizer motor 155 drives through the gear train 107 to position slider 105 of potentiometer 103 relative to resistor 104. The output from potentiometer 103 is supplied through conductor 108, terminal 118, resistor 120, to summing conductor 121. Thus, the potentiometer 103 repeats the control signal from synchro rotor winding 126 during heading stabilization. The heading stabilizing or heading error signal to control network 16 is supplied through conductor 108, terminal 118, resistor 109, resistor 110, terminal 111, conductor 112, terminal 96, relay contact-$p$, conductor 97, relay contact-$t$, voltage divider 99, resistor 101, to summing conductor 36 of network 16.

Control signals for controlling the craft to a chosen ground track are derived from a localizer beam guidance coupler 144. The beam guidance coupler 144 may be similar to an arrangement in a prior application of Waldo H. Kliever, Serial No. 24,869, filed May 3, 1948. The coupler output conductor 146 has an output signal thereon which depends on the distance of the craft from the center of the radio beam and is similar to that on conductor 92 in the Kliever arrangement. The output signal from coupler 144 which is transmitted to conductor 146 is supplied through a voltage dividing potentiometer 145 and a closed single pole single throw switch 148 to input conductor 149 of the compass synchronizer amplifier 134. At this time switch 133 is in the open position. The signal from the coupler 144 on compass amplifier 134 causes the motor 138 to rotate as long as there is a beam error signal or as long as the craft is displaced from a chosen ground track defined by radio beams. The motor 138 rotates at a speed proportional to the magnitude of the signal on conductor 146. The motor 138 operates the synchro rotor winding 126 so that a signal is developed in the rotor winding which is a function of the displacement of the craft from the chosen ground track as well as the angular difference between the craft heading and the gyrosyn direction. The operation of the winding 126 by motor 138 provides in winding 126 an effect on its signal that is an integration of the signal proportional to the displacement of the craft from the chosen ground track. An additional beam displacement signal is supplied from conductor 146, branch conductor 170, single pole single throw switch 171, to one end of a resistor 172 of a voltage dividing potentiometer 173 having its opposite end grounded. Potentiometer 173 includes an adjustable tap 174. A summing resistor 176 connects tap 174 with summing conductor 121.

The object of integrating the error representing the displacement of the craft from the chosen ground track defined by radio beams through the compass synchronizer motor 138 will be clarified in view of the following explanation. If the aircraft were at an angle to the chosen ground track and if a beam displacement signal were derived from coupler 144 and applied only through voltage divider 173 and resistor 176 to conductor 121, the craft would change heading in response to such signal. However, such change in heading from the displacement signal would be opposed by an increasing heading error signal from synchro winding 126. Consequently, the craft would eventually attain a heading and flight path parallel to the chosen ground track. In the situation this heading error signal would be opposed and balanced by the displacement signal representing the error in position of the craft from the chosen ground track. In order that the craft be made to fly along the chosen ground track, the signal from the beam guidance coupler 144 is integrated through the compass synchronizer motor 138 which positions winding 126. Thus the craft may attain the desired chosen ground track at which time the synchro rotor winding 126 which has been rotated in accordance with the integration of the craft displacement error will have no error signal induced therein since the integration of the displacement signal will cause a rotation of the winding 126 sufficient to null the heading error signal from the gyrosyn.

Should a crosswind be blowing, the integration of the craft displacement from the chosen ground track will cause the craft to head unwind across the chosen ground track to compensate for such crosswinds or other mistrim effects on the craft.

Figure 1B:
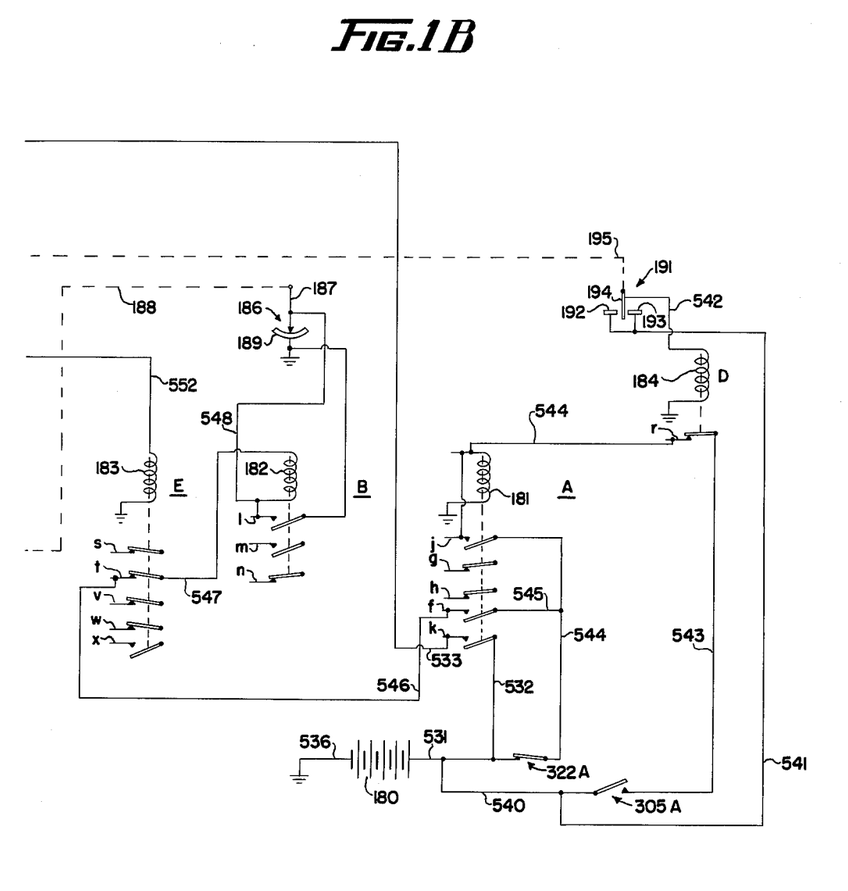

Consideration will be given to the various relays in FIGURES 1A and 1B for the roll channel of the autopilot which are operated in accordance with the various modes of control of the servomotor 10. The various modes are pre-autopilot engage, heading engage, beam guidance and control stick steering. Referring to FIGURE 1B, there is provided an engage relay A of a five pole type having three in or normally open contacts $j$, $f$, $k$ and two out or normally closed contacts $g$, $h$; a three pole heading engage relay B having a pair of in contacts $l$, $m$, and a normally closed or out contact $n$; a five pole control stick steering relay E having normally closed contacts $s$, $t$, $v$, $w$, and a normally open or in contact $x$; an anti-engage relay D having a single pole and a normally closed or out contact $r$. Relays A, B, E, and D include operating windings 181, 182, 183, and 184. FIGURE 1B also contains a sector switch 186 having an operable arm 187 positioned relative to a contact 189 in accordance with the bank angle of the craft. In level position of the craft, the contact extends approximately 7 degrees to either side of the center position of contact 187. There is also included an anti-engage relay switch 191 having a pair of spaced contacts 192, 193 interconnected, and an operable contactor 194 operated through suitable positioning means 195 extending from a trim actuator 457 in servomotor 10 to be described.

FIGURE 1A includes a bank angle responsive switch 197 having a segmental contact member 198 and an operable contactor 199. The segment 198 in the normal position of contactor 199 when the craft is level laterally extends approximately 75 degrees on either side of the contactor. The switch 197 controls the energization of an operating winding 200 of a three pole relay C having an in contact $p$ and two out contacts $o$, $q$.

The energization of the E relay, FIGURE 1B, is controlled by a control stick operated switch 202 comprising spaced contacts 203, 204 and an operable contactor 205. Contacts 203, 204 are supported on the mounting means of resistor 68 whereas contactor 205 is carried on the spindle 78 so that upon application of force to the control stick 72 contactor 205 engages contact 203 or 204 depending upon the direction of application of the force. The control circuits for the remaining relays will be subsequently considered.

Figure 2:
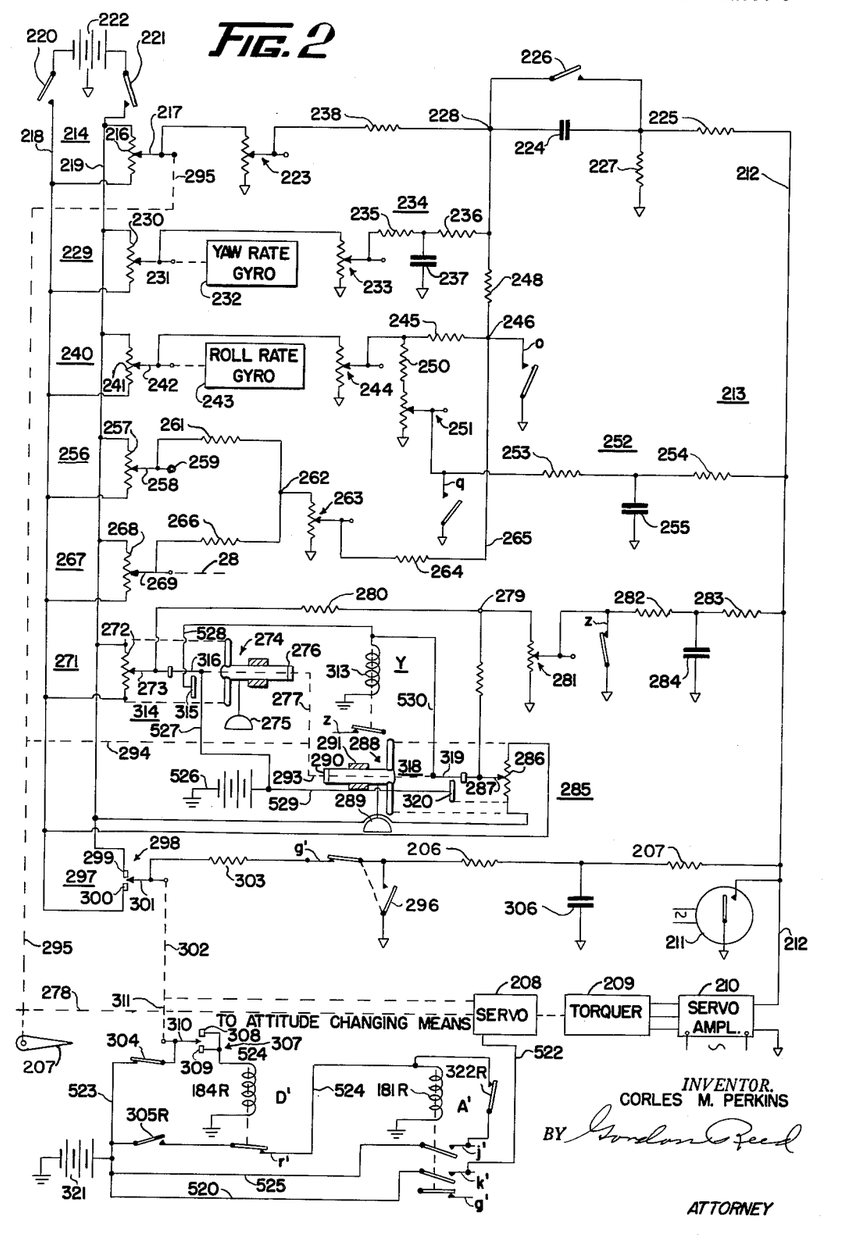
FIGURE 2 is a schematic diagram of the rudder channel of the three-channel automatic pilot embodying various sources of rudder control signals.

FIGURE 2 illustrates the arrangement for controlling the craft about its vertical or turn axis. In the figure, a hydraulic servomotor 208 positions the attitude changing means such as the rudder 207 of the craft. The servo-motor includes a control valve positioned by a torque motor 209.

The torque motor 209 includes a pair of control windings which are alternatively energized from the output of a servomotor amplifier 210, and which of the windings is energized depends upon the phase relationship of a control signal voltage relative to the voltage from a power supply connected to the amplifier. The amplifier, torque motor, servomotor arrangement is similar to that utilized in the pitch channel and to be described in detail hereinafter. A.C. control signals are supplied to servo amplifier 210 through a D.C. to A.C. converter 211 which is supplied with D.C. signals by summing conductor 212 connected thereto. Conductor 212 constitutes part of a balanceable parallel summing D.C. signal network 213. Network 213 comprises a servo follow-up signal generator 214, a yaw rate signal generator 229, a roll rate signal generator 240, a trim signal generator 256, an aileron follow-up signal generator 267, a left rudder pedal signal generator 271, a right rudder pedal signal generator 285, and a pre-engage trim signal generator 297.

Signal generator 214 comprises a follow-up potentiometer having a resistor 216 connected across D.C. supply conductors 218, 219. Conductor 218 is connected through a single pole switch 220 to one side of a D.C. supply 222 and conductor 219 is connected through single pole single throw switch 221 to the opposite side of the supply 222. The supply has a center tap connected to signal ground ($\nabla$). The potentiometer includes an operable slider 217 displaced along resistor 216 in either direction from a normal position thereof by a suitable operating means 295 extending from the rudder operating means 278 driven by servomotor 208. A resistor of a voltage dividing potentiometer 223 is connected between the slider and signal ground. Potentiometer 223 includes an adjustable tap which is connected through summing resistor 238 to a terminal 228. A capacitor 224 and a resistor 225 in series extend between terminal 228 and summing conductor 212. The junction of capacitor 224 and resistor 225 is connected to signal ground through a resistor 227. Capacitor 224 may be shunted by a single pole single throw switch 226.

Signal generator 229 comprises a yaw rate gyroscope operated potentiometer having a resistor 230 connected across conductors 218, 219 and a slider 231 operated by a yaw rate gyroscope 232 which detects rate of turn of the craft about its vertical or turn axis. A voltage dividing potentiometer 233 has its resistor connected between slider 231 and signal ground. Potentiometer 233 includes an adjustable tap which is connected through resistors 235, 236 in series to terminal 228. A capacitor 237 connects the junction of resistors 235 and 236 to signal ground.

Signal generator 240 comprises a roll rate gyroscope operated potentiometer having a resistor 241 connected across conductors 218 and 219 and a slider 242 adjusted along resistor 241 in either direction from a normal position by a rate gyroscope 243 which senses craft rate of roll. A voltage dividing potentiometer 244 has its resistor connected between slider 242 and signal ground, and it includes an adjustable tap which is connected through a resistor 245 to a terminal 246. A resistor 248 connects terminal 246 to terminal 228. Terminal 246 is connected to signal ground through an out contact $o$ of relay C. The adjustable tap of voltage divider 244 is also connected through resistor 250 to one end of a resistor of a voltage dividing potentiometer 251 having its opposite end connected to signal ground. Voltage divider 251 includes an adjustable tap which is connected through series resistors 253, 254 to summing conductor 212. The junction of resistors 253, 254 is connected to signal ground through a capacitor 255. The resistors 253, 254 and capacitor 255 constitute a lag network 252 to provide a lagging effect on the roll rate signal from the signal generator 240 applied to conductor 212. The adjustable tap of potentiometer 251 is connected through an out contact $q$ of relay C to signal ground.

Trim signal generator 256 includes a potentiometer having a resistor 257 connected across conductors 218, 219 and an adjustable slider 258 positioned in either direction along resistor 257 by suitable operating means 259. A resistor 261 connects slider 258 to a terminal 262. A voltage dividing potentiometer 263 has a resistor connected between terminal 262 and signal ground. Potentiometer 263 includes an adjustable tap which is connected through a resistor 264 and conductor 265, in series, to terminal 246.

Signal generator 267 includes an aileron follow-up potentiometer having a resistor 268 connected across the supply conductors 218, 219 and an adjustable slider 269 positioned along resistor 268 in either direction from a normal position thereon in accordance with the displacement of the aileron surface 270 of the craft. Slider 269 may be positioned by the operating means 28 that also positions slider 21 of the signal generator 18, FIGURE 1A. A resistor 266 connects slider 269 to terminal 262.

Signal generator 271 comprises a potentiometer having a resistor 272 connected across conductors 218, 219 and an adjustable slide 273 positioned in either direction along resistor 272 from a normal position in accordance with the force applied to a left rudder pedal 275 by the pilot. The relative displacement of slider 273 and resistor 272 is effected through a force or torque responsive arrangement similar to that utilized with control stick 72, FIGURE 1A, and thus it includes a torque tube that supports resistor 272 and a spindle that supports slider 273. The arrangement includes a pedal 275 axially displaced from a hub 276 which hub is connected through suitable operating means 277, 294, 295 to the servo operated means 278 so that upon application of force to pedal 275 the resistor and slider will be relatively displaced. The slider 273 is connected by a resistor 280 to a terminal 279. A voltage dividing potentiometer 281 has its resistor connected between terminal 279 and signal ground, and the potentiometer includes an adjustable tap which is connected by series arranged resistors 282, 283 to summing conductor 212. The junction of resistors 282, 283 is connected by a capacitor 284 to signal ground, and the opposite end of resistor 282 is connected to signal ground through a normally closed contact z of a yaw maneuver relay Y, FIGURE 2.

Signal generator 285 includes a potentiometer having a resistor 286 connected across supply conductors 218, 219 and an adjustable slider 287 positioned in either direction from a normal position on resistor 286. The slider 287 is displaced relative to resistor 286 by a torque responsive arrangement 288 similar to that provided for the left rudder pedal. It comprises a torque tube which supports the resistor 286 and a spindle interior of and concentric with the tube which supports the slider 287 from a hub 290 which is connected through suitable operating means 293 to the operating means 294. A right rudder pedal 289 depends from the torque tube at a distance axially displaced from hub 290.

Signal generator 297 comprises a source of fixed voltage 298 of one polarity or the other having a pair of spaced contacts 299, 300 separately connected to conductors 219, 218 respectively. An operable contactor 301 engages either contact 299 or 300 when displaced. In normal position neither contact is engaged by the contactor. The contact is operated by suitable means 302 extending from a trim actuator in servo 208. Contactor 301 is connected through a resistor 303, an out contact g' of a rudder engage relay A', resistor 206, resistor 207, to summing conductor 212. The junction of resistors 206 and 207 is connected to signal ground by a capacitor 306 and the opposite end of resistor 206 is connected to signal ground through a switch 296 operable with the relay arm engaging contact g' of the relay A'.

With respect to the relays in the rudder channel, servo engage relay A' has an operating winding 181R and three operable arms two of which engage in contacts j' and k' and the third engaging out contact g'. Anti-engage relay D' has an operating winding 184R which operates a single arm which coacts with an out contact r'. The energization of winding 184R is controlled by an anti-engage switch 307 having a pair of spaced contacts 308, 309 interconnected and a contactor 310 which is normally centered between the contacts in unenergized relation and operated through suitable operating means 311 from the trim actuating motor in servo 208. A yaw maneuver relay Y includes an operating winding 313 which operates an arm which coacts with an out contact z. Winding 313 is energized alternatively by operation of the left rudder pedal 275 or the right rudder pedal 289. Left rudder pedal 275 operates a pedal torque responsive switch 314 comprising a contact 315 supported on the mounting means of resistor 272 and a contactor 316 supported with slider 273 so that upon application of force to pedal 275 a relative displacement of contactor 316 and contact 315 occurs closing a circuit to relay winding 313. Similarly application of force to the right rudder pedal 289 operates a switch 318 comprising a contactor 319 carried on the supporting means of slider 287 and a contact 320 carried on the supporting means for resistor 286. The rudder channel arrangement additionally includes a normally open rudder servo engage switch 305R, a normally closed disconnect switch 322R, a supply 321, and a normally closed control switch 304.

Figure 3A:
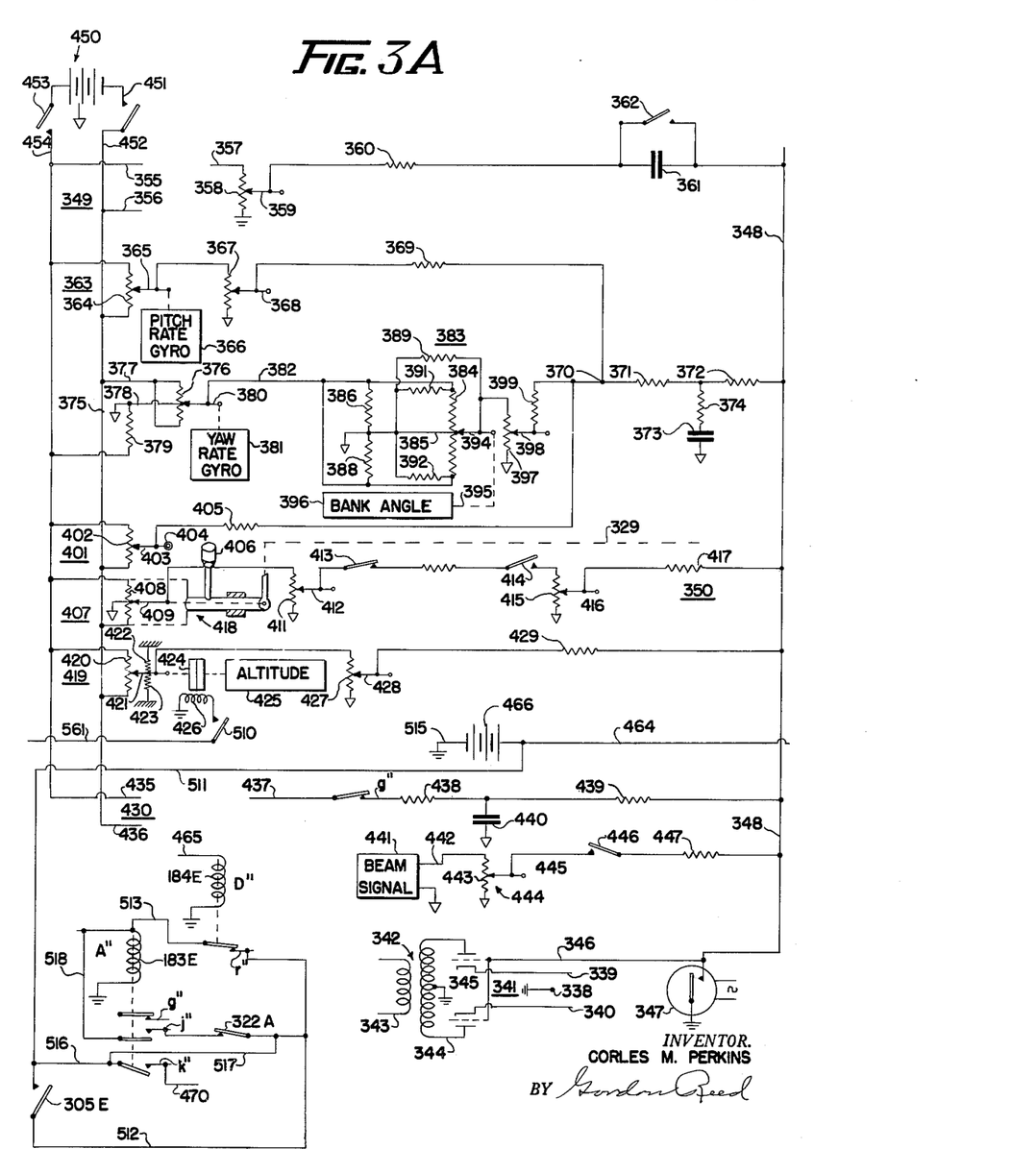
FIGURES 3A and 3B comprise the schematic of the pitch axis control channel of the three-channel automatic pilot with FIGURE 3A showing the various sources of control signals and FIGURE 3B illustrating a preferred type of hydraulic servomotor for positioning attitude changing means of the craft.
Figure 3B:
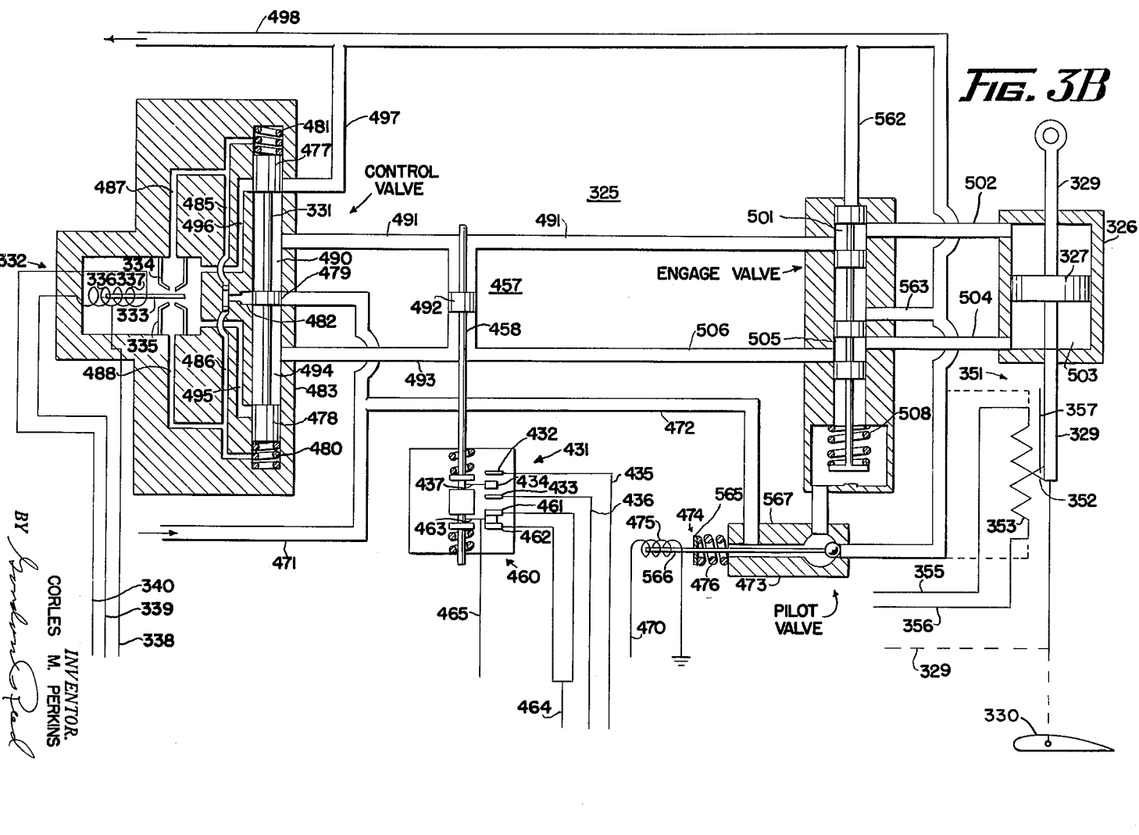

In the pitch channel shown in FIGURES 3A and 3B, a hydraulic servomotor 325 having a power section 326 comprising an operable ram 327 operates through piston rod 329 to position pitch attitude control means such as the elevator 330 of the aircraft. The direction of movement of ram 327 is controlled by a displaceable control valve 331. The direction of displacement of control valve 331 is controlled by a torque motor 332 which positions a member or flapper 333 relative to fluid orifices 334, 335 to reversibly control displacement of valve 331. The member 333 as stated is positioned by torque motor 332 having a pair of operating windings 336, 337. Windings 336 and 337 are energized from an AC discriminator amplifier 341, FIGURE 3A, and to this purpose an end of each winding has a common connection connected to ground terminal 338 of the amplifier 341 and their opposite ends connected through conductors 339, 340 to separate cathodes of a double triode tube 345. The double triode includes a pair of plate elements which are connected to the opposite ends of a secondary winding 334, 335 to reversibly control displacement of valve 331. The center tap of the secondary winding 334 is connected to ground and thus to conductor 338. The grids of the double triodes are connected together and their junction is connected by a conductor 346 to an output side of a D.C. to A.C. converter 347, which may be of the vibrator type, to receive A.C. control signals. D.C. control signals are supplied to the input side of the converter 347 by a summing conductor 348 of a balanceable, parallel summing, D.C. signal network 350.

Balanceable network 350 comprises a follow-up signal generator 349, a pitch rate signal generator 363, an apparent or false pitch rate signal compensation signal generator 375, a trim signal generator 401, a control stick steering signal generator 407, an altitude signal generator 419, and a preengage signal generator 430.

The follow-up signal generator 349 includes a potentiometer 351 FIGURE 3B comprising an adjustable slider 352 positioned from the servo operated means 329 and a resistor 353 connected by conductors 355, 356 to a D.C. supply source. A conductor 357 connects slider 352 to one end of a resistor 358 of a voltage dividing potentiometer having its opposite end connected to signal ground. The potentiometer includes an adjustable tap 359 which is connected through a resistor 360 and capacitor 361, in series, to network summing conductor 348. The capacitor 361 may be shunted by a single pole single throw switch 362. The slider 352 is positioned in either direction by the operating means 329 from a normal position on resistor 353.

Generator 363 comprises a potentiometer having a resistor 364 connected across supply conductors 452, 454 and an adjustable slider 365 which is positioned along resistor in either direction from a normal position thereon by a pitch rate gyroscope 366 sensing rate of change of pitch attitude of the craft. A resistor 367 of a voltage dividing potentiometer connects slider 365 to signal ground. An adjustable tap 368 coacting with resistor 367 is connected through a summing resistor 369 to a terminal 370. Terminal 370 is connected through two series resistors 371, 372 to summing conductor 348. The common junction of resistors 371, 372 is connected to signal ground through a resistor 374 and capacitor 373 connected in series. The resistors 371, 372, 374 and capacitor 373 form lag-rate network which provides pitch rate and lagged pitch rate signals to conductor 348.

The compensation signal generator 375 comprises a potentiometer which includes a resistor 376 having both ends connected through a conductor 377 to D.C. supply conductor 452 and a center tap of resistor 376 connected to signal ground and through a branch circuit including resistor 379 connected to the other D.C. supply conductor 454 of opposite polarity. A slider 380 is positioned along resistor 376 from the center tap thereof in either direction by a yaw rate gyroscope 381 responsive to the rate of turn of the craft about its vertical axis. A single polarity voltage is thus provided by the signal generator 375 irrespective of the direction of movement of slider 380 in response to the craft rate of turn. A conductor 382 connects slider 380 to a tangent potentiometer arrangement 383. The arrangement 383 includes an adjustable slider 394 displaced over a resistor 384 in either direction from a center tap 385 thereof in accordance with the bank angle of the craft through suitable operating means 395 extending thereto from a bank angle sensing device 396 which may be a vertical gyroscope. The arrangement is such that the single polarity signal voltage on slider 394 relative to signal ground is equal to the yaw rate sensed by gyroscope 381 multiplied by the tangent of the bank angle so as to compensate for the undesired false or apparent pitch rate signal of single polarity from pitch rate gyroscope 366 which senses an apparent upward pitch rate while the craft is in a banked turn. The relationship of the operations of the two rate gyroscopes and vertical gyroscope is expressed as $\dot{r}$ tan $\phi = \dot{p}$ where $\dot{r}$ and $\dot{p}$ are indicated yaw and pitch rates and $\phi$ is the bank angle. In arrangement 383, resistor 384 has both of its ends connected to conductor 382. A center tap 385 extends from resistor 384 to signal ground. Across resistor 384 is a further resistor having sections 386, 388 the common junction of which is connected to signal ground. A loading resistor 389 is connected between center tap 385 and slider 394, and an additional loading resistor 391 is connected between center tap 385 and one end of resistor 384. A second loading resistor 392 is connected between center tap 385 and the opposite end of resistor 384. A voltage dividing potentiometer has its resistor 397 connected between slider 394 and signal ground. An adjustable tap 398 of the potentiometer is connected by a summing resistor 399 to terminal 370.

The trim signal generator 401 has a potentiometer having a resistor 402 connected across supply conductors 452, 454 and an adjustable slider 403 adjustable by a knob 404. Slider 403 is connected by a summing resistor 405 to terminal 370.

Signal generator 407 comprises a potentiometer having a resistor 408 and an adjustable slider 409 positioned relative to resistor 408 from the manually operable elevator control stick 406 through a torque sensing device (not shown) similar to the torque sensing means between resistor 68 and slider 69 in the aileron control channel operated from the control stick 72. While the control sticks 72, 406 are indicated as separate devices, such illustration is done merely for simplification, and a single control stick of the aircraft displaceable about two respectively horizontal axes would ordinarily be utilized. A resistor 411 of a ratio or voltage dividing potentiometer is connected between slider 409 and signal ground. The voltage divider includes an adjustable slider 412 which is connected through a normally closed single pole-single throw switch 413 and normally open single-pole single through switch 414 to one end of a resistor 415 of a further voltage divider having its opposite end connected to signal ground. The voltage divider includes an adjustable tap 416 which is connected through a resistor 417 to summing conductor 348. The switch 414 is preferably closed when force is applied to the control column 406. Switch 413 is open during altitude or beam guidance control.

Altitude signal generator 419 comprises a potentiometer having a resistor 420 connected across supply conductors 452, 454 and a slider 421 normally biased by spring means 422, 423 to a normal position on resistor 420. Slider 421 is operated by an altitude sensing device 425 through a magnetic clutch 424 having an operating winding 426. The altitude controller may be similar to that disclosed in the prior application of Robert J. Kutzler, Serial No. 208,391, filed January 29, 1951, now U.S. Patent 2,820,188. The potentiometer 68 in the Kutzler apparatus corresponds with the potentiometer comprising resistor 420 and slider 421 in the present application. A voltage dividing potentiometer has a resistor 427 connected between slider 421 and signal ground; the potentiometer includes an adjustable tap 428 which is connected through a summing resistor 429 to conductor 348. The pre-engage trim signal generator 430 comprises a contact arrangement 431 FIGURE 3B comprising a pair of spaced contacts 432, 433 and an operable contactor 434 positioned by a piston rod 458 of a trim actuator 457. Contact 432 is connected through a conductor 435 to supply conductor 454 and contact 433 is connected through conductor 436 to supply conductor 452. Contactor 434 has a conductor 437 extending therefrom and is connected to summing conductor 348 to supply a trim signal thereto through an out contact $g''$ of an elevator channel engage relay $A''$, a resistor 438, and a resistor 439 to conductor 348. The junction of resistors 438 and 439 is connected to signal ground through a capacitor 440.

Glide path beam signals proportional to the displacement of the craft from a vertical path defined by radio signals are supplied by radio responsive means 441 which has an output conduct 442 connnected to one end of a voltage dividing resistor 443 of a voltage dividing potentiometer 444 having its opposite end connected to signal ground. Engaging the resistor is an adjustable tap 445 which is connected through a switch 446 and summing resistor 447 to summing conductor 348. The device 441 is for providing a glide path beam signal and such devices have been heretofore provided. The device 441 may be similar to the glide path receiver of U.S. Patent 2,670,454 having a D.C. output across terminal 13, 14 similar to the output conductor 442 and signal ground herein.

The potentiometer resistors 353, 364, 402, 408, 420 are all connected in parallel across supply conductors 452, 454 which are connected to D.C. supply by switches 451, 453.

The elevator channel additionally includes an anti-engage relay $D''$ having an operating winding 184E positioning a relay arm into engagement or disengagement from an out contact $r''$. Energization of winding 184E is provided by a contactor arrangement 460 FIGURE 3B comprising a pair of spaced contacts 461, 462 and a contactor 463. Contacts 461, 462 are connected together, and a conductor 464 extends from their junction to battery 466 FIGURE 3A having its opposite terminal connected to ground.

The elevator channel includes an engage relay $A''$, a normally open manually selective engage switch 305E, a normally closed disconnect switch 322A. Relay $A''$ includes a normally closed or out contact $g''$; and a normally open or in contact $j''$ and a second in contact $k''$.

A form of hydraulic servomotor used in each of the three channels of the autopilot is shown in detail in FIGURE 3B. In FIGURE 3B, a pressure line 471 from the fluid source has a branch line 472 supplying pressure to a pilot valve 473 which in the servo disengaged mode or when the servo is ineffective has its valve stem 474 moved to the leftward position by a spring 476. During the servo engaged mode, winding 475 is energized through relay A in contact $k$ and spring 476 is compressed while winding 475 forces the valve to the right position shown in FIGURE 3B to effect main servo operation in a manner to be described. The servo motor includes a control valve 331 having end lands 477, 478 and an intermediate land 479. Spring means 481 and 480 operating on the end lands in an axial direction center the valve so that the middle land 479 in conjunction with an angular groove 482 in the valve housing 483 forms a passage for fluid from supply 471 which passes through branch lines 485, 486 to sub-branches 487, 488 associated with orifices or nozzles 334, 335. When a member 333 or flapper is moved toward one or the other of orifices 334, 335 by the torque motor 332, the relative fluid pressure in branch lines 485, 486 which communicate with opposite ends of valve 331 will vary and cause movement of the control valve 331 in one or the other direction. Assuming the valve 331 being moved downwardly, pressure from supply 471 passes upwardly through chamber or space 490 above land 479, through the control valve housing 483 through conduit 491 to the trim actuator 457 displacing its ram 492 downwardly. This movement of ram 492 moves the fluid on the opposite side of the ram through conduit 493 into space 494 below valve land 479 from where it passes through conduit 495 and conduit 496 around an annular passage in valve casing 483 to conduit 497 and to the fluid return line 498. The operation of the trim actuator 497 operates both contactors 463 and 434.

With the pilot valve stem 471 in the right position, shown in the servo assembly, the fluid source pressure passes through the pilot valve forcing the engage valve upwardly to the position shown in FIGUE 3B and fluid pressure passes through chamber 501 and conduit 502 to the upper end in FIGURE 3B of the ram 327 moving it downwardly, assuming again control valve 331 is in down position. The exhaust fluid from the cylinder space 503 below the ram 327 exhausts through conduit 504, space 505 in the engage valve, conduit 506 to conduit 493 connected under the assumed conditions to return 498. The pressure on the upper end of ram 327 causes the displacement of the potentiometer slider 352 relative to resistor 353 to provide a follow-up signal.

When the actuating solenoid for valve 473 is deenergized to permit spring 474 between a collar 565 fixed on valve stem 566 and valve body 567 to move the valve to the leftward position, a spring 508 moves the engage valve to a downward position whereby no communication between fluid conduit 491 and conduit 502 can be effected and similarly no communication can be had between conduit 504 and conduit 506 so that no operation of the ram 327 from the operation of control valve 331 results. However, direct manual operation involving displacement of ram 327 is permitted since the opposed sides thereof are connected to exhaust or return lines. This deenergization occurs in the disengaged mode. It is evident that with the shut-off valve 473 in the leftward position that direct manual operation of the control surface actuator 329 may be effected from the control column 406, FIGURE 3A, since conduits 502 and 504 are in communication with return conduits 562, 563.

*Operation*

Before any particular autopilot channel is engaged wherein its servomotor will position its control surface, such control surface may be directly manually positioned to select a desired attitude about a particular axis.

If the pitch channel amplifier bridge 350 at this time is unbalanced, a signal therefrom is applied through summing conductor 348 and converter 347 to the phase sensitive amplifier 341 which energizes one or the other of torque motor windings 336, 337 whereby the member 333 is moved toward an orifice and thus causes the positioning of the servo control valve 331. This positioning of the control valve operates the trim actuator 457 which moves contactor 434 whereby it engages one or the other of contacts 432, 433 to provide a pre-engage signal into network 350 to effect balance thereof. During the engagement of contact 434 with either contact 432 or 433, capacitor 440 is substantially charged. When the network is balanced, the actuator 457 will return to its normal central position wherein contactor 434 engages neither contactor 432 or 433. The capacitor 440 will discharge over resistor 439 and through the network 350 to maintain the balance of network 350 for a short period. The resistor 439 is greater than the resistor 438 so that by the combination of two resistors and capacitor 440 a quick charge and slow discharge circuit is provided.

To engage the servomotor with its control surface for the purpose of operating the surface from the servomotor, and with the network in balanced condition, closing of the engage switch 305E completes a circuit from battery 466, conductor 511, switch 305E, conductor 512, out contact $r''$ of the anti-engage relay D'', conductor 513, operating winding 183E to ground and return to battery ground 515.

With the engage relay A'' operated, relay contact $g''$ is opened to isolate the pre-engaged trim signal generator 430 from the network 350. A holding circuit for the relay operating winding 183E is effected through energized conductor 511, branch conductor 516, conductor 517, disconnect switch 322A, in contact $j''$, conductor 518 to winding 183E, and to ground.

Operation of the engage relay A'' closes the circuit for the operating windings 475 of the servo pilot valve 473 at contact $k''$ to move the valve in the rightward position shown in the servomotor assembly and tensioning spring 476.

With bridge supply switches 451 and 453 which energize supply conductors 452, 454 closed, signals may be provided by the pitch rate gyroscope 366 through its generator 363 which are applied through the lag network, comprising resistor 371, 372, 374, and capacitor 373, to provide short term stability to the craft pitch attitude.

When manual changes in pitch attitude are to be effected through control stick 406 and servomotor 325, the switch 414 is closed when force is applied to control stick 406 permitting control signals from the signal generator 407 to be applied to network 350 to effect operation of the elevator surface. The servomotor 325 operates potentiometer 351 to rebalance the network.

Altitude control may be applied by opening switch 413 in the control stick steering signal generator and closing an altitude control switch 510 which completes an altitude engage circuit from battery 560 FIGURE 1A, switch 197, conductor 561, switch 510, magnetic clutch winding 426 to ground thus permitting the altitude controller 425 to operate the altitude displacement slider 421.

Control of the craft to a glide path radio beam may be effected by opening switch 413 in the control stick steering signal generator and closing switch 446 whereby glide path control signals from beam responsive device 441 are applied to network 350 to effect operation of the elevator surface.

In the rudder channel in FIGURE 2 during operative disengagement of the servomotor 208 from its control surface manual operation of the rudder surface directly from control pedals 275, 289 may be effected. Meanwhile a spring in the pilot valve in servo 208 serves to block pressure to the engage valve, these valves corresponding to those similar elements described in detail in servomotor 325, FIGURE 3B. Any unbalance in the servo network 213 operates amplifier 210 and causes operation of the torque motor 209 whereby the contactor 301 is operated to provide a pre-engage signal through generator 297 to network 213.

At the same time, the contactor 310 FIGURE 2 engages contact 308 or 309 to complete a circuit from battery 321, conductor 523, switch 304, contactor 310, contact 308 or 309, conductor 524, winding 184R, to ground and return to battery 321. Such energization of winding 184R disengages the contact r' of the anti-engage relay D' from its associated arm thereby preventing energization of the engage relay A'.

When the network 213 is balanced, and the trim actuator in servo 208 in its normal position, the relay arm engages out contact r' of the anti-engage relay D' and an engage circuit may now be completed from battery 321, engage switch 305R, relay contact r', conductor 524, engage relay winding 181R to ground and return to battery 321. As winding 181R operates, a holding circuit is provided from battery 321, conductor 525, engage relay in contact j', disconnect switch 322R, winding 181R, to ground and return to battery 321.

The control switches 220, 221 for the bridge supply conductors 218, 219 may be closed to permit energization of the conductors. The pre-engage trim signal generator 297 is now isolated from network 213 at in contact g'. A switch 296 may be closed as contact g' is disengaged thereby connecting the left end of resistor 206 to signal ground.

The rudder channel is a turn coordination aid and is operated during banked turns from the aileron follow-up signal generator 267. However, the rudder channel functions alone to damp Dutch roll oscillations of the craft. For this purpose, the yaw rate gyroscope 232 may operate signal generator 229 to provide the damping signals.

When desired, the rudder surface may be manually operated through the autopilot by operating the rudder pedals 275, 289 either of which effects energization of the yaw out relay Y from its circuit extending from battery 526, conductor 527, torque responsive switch 314, operated by rudder pedal 275, conductor 528, relay operating winding 313, to ground and return to battery 526. The relay contact z is now disengaged to open the ground connection from resistor 282 to permit rudder pedal signals to be aplied from terminal 279 to network conductor 212. A similar relay control circuit is provided for pedal 289 extending from battery 526, conductor 529, switch contact 320, switch contactor 319, conductor 530, relay winding 313, to ground and returns to battery 526.

The aileron channel of FIGURES 1A and 1B has as stated four modes or configurations, (1) a disengage mode, (2) heading stabilization, (3) control stick steering mode, and (4) localizer or radio beam control. In the servomotor disengage mode, the spring of the pilot valve in servo 10 closes this valve. The operation of the trim actuator in servo 10 on unbalance of network 16 positions through operating means 537 contactor 59 in signal generator 55 to engage contact 57 or contact 58 to supply a pre-engage signal through out contact g of the engage relay A to summing conductor 36. Similarly the trim actuator through the actuating means FIGURE 1A, 537, 538, 195, operates the operable contact arm 194 of switch 191 to energize winding 184 of the anti-engage relay D from a circuit comprising battery 180 FIGURE 1B, conductor 531, conductor 540, conductor 541, contact 192 or 193, contactor 194, conductor 542, winding 184, to ground and return to battery ground 536.

When the bridge 16 is balanced permitting anti-engage contact r to be engaged with its arm, the engage switch 305A may be selectively closed completing a circuit from battery 180, conductor 531, conductor 540, switch 305A, conductor 543, relay contact r, conductor 544, winding 181 of the engage relay A, to ground and return to battery ground 536. The pilot valve 473 in servo 10 is moved to open position by its operating winding 475 energized by a circuit comprising battery 180, conductor 531, conductor relay A, in contact k, conductors 533, 470 through the winding 475 and return to battery ground 536.

Prior to this operation of the engage switch 305A, the aileron control surfaces could be operated directly manually from control stick 72. The operation of the ailerons would cause the craft to bank. The rudder surface, FIGURE 2, could be directly operated from the pedals 275, 289 so that aileron and rudder operations could be made to place the craft on a desired bank attitude and heading. During such manual control, any signal in the heading pickoff 124 would be applied through closed switches 122, 133 to the compass synchronizer amplifier 134 which would operate the motor 138 and rotor 126 to null the synchro 10.

Following operation of the aileron channel engage switch 305A and energization of the engage relay A, switch 122 is opened. If the craft deviates from its heading, error signals are induced in synchro rotor 126. With the craft within 7.5 degrees of level attitude about its roll axis, the heading engage relay B is energized through a circuit comprising battery 180 FIGURE 1B, conductor 531, disconnect switch 322A, conductor 544, conductor 545, in contact f of the engage relay A, conductor 546, out contact t of the control stick steering relay E, conductor 547, relay winding 182, to ground and return to battery ground 536. Heading stabilizing signals are thus supplied from the synchro rotor winding 126 FIGURE 1A through the in contact m of the B relay and the out contact v of the E relay to the conductor 116 to control the bank synchronizer amplifier 152 and effect positioning of the slider 105 of the bank synchronizing signal generator 102. Signal generator 102 balances the input circuit of bank synchronizer amplifier 152 and also supplies through resistors 109, 110, conductor 112, in contact p of relay C, conductor 97, out contact t to network summing conductor 36 to effect operation of the aileron servomotor 10. In addition to positioning the aileron surfaces, motor 10 operates the aileron follow-up potentiometer slider 269 in the rudder channel, FIGURE 2, to effect coordination of the rudder with respect to the aileron operation.

In the control stick steering mode, operation of the control stick 72 energizes winding 183 of the control stick steering relay E FIGURE 1B through a circuit comprising battery 550, FIGURE 1A, conductor 551, contactor 205, contact 203 or 204, conductor 552, winding 183, to ground and return to battery ground 553. Switch 122 and switch 133 FIGURE 1A are closed when on control stick steering mode so that the output of the heading synchro 124 is applied to the compass amplifier 134 which controls motor 138 to null the pickoff 124. Manual selective signals from control stick potentiometer 67 are applied to summing conductor 36 to initiate aileron operation which results in rudder operation as well. At this time the contact s of the control stick steering or E relay is in open circuit position removing the signal ground from the junction of resistors 85, 86.

The vertical gyro operated potentiometer 91 is isolated from summing conductor 36 through the now disengaged contact t of the E relay. The signals from the roll attitude signal generator potentiometer 91 however are applied through in contact x of relay E to conductor 116 to control the bank synchronizer 151 resulting in the operation of the bank synchronizer potentiometer slider 105 which causes the signal generator 102 to repeat the signal from bank signal generator 90. Consequently then if the automatic bank control is applied with the craft banked by releasing control stick 72, the bank attitude signal would be balanced so no sudden servomotor operation would occur. When the craft has attained a desired bank angle, the pilot restores the control stick 72 to its normal position, but if the bank angle is in excess of 7.5 degrees the heading engage relay B cannot be energized since its circuit is open at the vertical gyro operated bank responsive switch 186.

When the pilot attains a desired heading, he applies reverse aileron and rudder control and thereafter may return the control stick 72 to normal position. If the craft is within 7.5 degrees of level attitude about the roll axis, switch 186 is closed to permit energization of the heading engage relay B. Switch 122 may be opened in response to the energization of relay B, and heading signals from the synchro rotor 126 may again be applied to conductor 116 and converter 15 to effect heading control through the bank synchronizer 151.

Should the aircraft attain a bank attitude in excess of 75 degrees, switch contactor 199 FIGURE 1A is disengaged from its related contact 198 to open the circuit comprising battery 560, switch 197, conductor 201, winding 200 of the C relay resulting in the operation of relay C disengaging contact p but engaging contacts o and q. The vertical gyro with bank attitude exceeding 75 degrees is isolated at contact p, because of the inability of the gyro 94 to hold high bank angles with control stick 72 centered. The engagement of contact q at the high bank angle prevents the lag network 252 in FIGURE 2 from controlling the rudder network 213. The engagement of the contact o connects the terminal 246, FIGURE 2, to signal ground. Thus no roll rate nor lagged roll rate signal controls the rudder network 213 when the bank angle is in excess of 75 degrees, and this is provided as a safety feature in case of inverted flight when these signals would be of incorrect phase. In the pitch axis it will cause the removal of altitude control if such were in operation by opening the circuit of altitude engage clutch winding 426 at switch 197, since in high bank angles it is difficult to maintain constant altitude through elevator surface operation.

During localizer beam control switch 148 FIGURE 1A is closed, switch 171 is closed and switch 133 is opened permitting the beam guidance signals from coupler 144 to control the compass synchronizer amplifier 134 to operate motor 138 and to control the bank synchronizer. The heading engage relay B will be energized and through switch 171 and operation of motor 138 signals proportional to the displacement of the craft from the ground track defined by radio beams as well as the time integral of the displacement signals will be applied to the bank synchronizer amplifier 152 whereby the bank synchronizer potentiometer slider 105 is positioned to supply a beam guidance control signal to summing conductor 36 of the aileron control network 16.

It will now be apparent that I have provided a novel automatic pilot system for an aircraft based on parallel summing D.C. signal networks in which a novel means are provided for correcting the unbalanced condition of the networks during direct manual control of the craft attitude and that such autopilot includes provisions for manual control through the autopilot utilizing similar techniques as are utilized when direct manual control of the surfaces is being applied as well as including various compensation and protective features.

Since many changes can be made in the details of the above construction and many different embodiments of the invention could be made without departing from the scope of the invention, it is intended that all matter contained in the above description and illustrated in the accompanying drawings shall not be interpreted in a limiting sense but merely as illustrative of the invention.

I claim:

1. In control apparatus for controlling a flight condition of an aircraft including motor means operating a flight condition control device, including manual selector means to render the motor means effective or engaged, in combination: a balanceable D.C. signal summing network; means including a flight condition responsive device connected thereto for unbalancing said network; movable means responsive to said balanceable network means on unbalance thereof and momentarily displaced from a normal position and connected in feedback relation to said network for balancing said network; and further means connected to be energized in the displaced position of said movable means and effective on balance of said network to substantially maintain said balance despite return of said movable means to normal position for enabling manual selective control of said motor means by said balanceable network means on subsequent unbalance of said network.

2. In apparatus for controlling a motor operating a condition changing means for governing a condition, a displaceable biased control device; a balanceable parallel summing D.C. signal network connected thereto and displacing said device on unbalance of said network; further means responsive to operation of said device and positioning feedback means for rebalancing said network thus removing the displacement of the device; and interlock means controlled by said device and effective only on rebalance of said network for providing control of said motor by subsequent operation of said device to control said condition.

3. In condition control apparatus for controlling a motor operating a condition changing means, a control device; a balanceable parallel summing D.C. signal network operating said device on unbalance of said network; further means comprising an operable biased signal generator responsive to operation of said device; a signal storing device energized by said signal generator and connected to said network and releasing said signal to said network for rebalance thereof whereby said operated signal generator returns to unoperated position; and means controlled by the operated signal generator and effective only on rebalance of said network and return of said generator to unoperated position for providing control of said motor by said device whereby control of said condition changing means from said device is applied without sudden operation of said condition changing means.

4. In an automatic pilot for an aircraft having attitude changing means and manual and hydraulic servomotor means positioning said attitude changing means, said servomotor including a center position biased control valve and power section, in combination: control means operating said valve; a balanceable signal network connected to operate said control means on network unbalance; means comprising a signal generator biased to an unoperated position and operatively responsive to operation of said valve from a normal position; a signal storage means receiving a signal from said signal generator and connected to said network and supplying said signal to said network to provide balance thereof while said signal generator and valve return to unoperated position; and further means responsive to displacement of said valve from normal position blocking passage of fluid through the operated control valve to the power section to prevent control of said servomotor by said valve.

5. In an automatic pilot for an aircraft having attitude changing means with manual and hydraulic servomotor means positioning said attitude changing means, said servomotor including a displaceable control valve, in combination: control means operating said valve; a balanceable signal voltage network having output member connected to said control means for operating said control means on unbalance of said network; a signal voltage generator operatively responsive to operation of said valve from a normal position; a signal storage means comprising resistors and a capacitor having a quick charge and slow discharge path responsive to said signal voltage generator and connected to said network to provide substantial balance thereof while said signal generator and valve return to unoperated positions; and selective valve means effective on balance of said network enabling control of said servomotor by said control valve on subsequent unbalance of said network.

6. Control apparatus for an aircraft having pitch attitude changing means and motor means operating said attitude changing means, said apparatus comprising: means including a balanceable D.C. signal parallel summing network operating said motor means on unbalance of said network; a pitch rate responsive device; a pitch rate D.C. signal generator operated by said device; a resistor-capacitor lag network connecting said signal generator connected to the network to said network; a follow-up signal generator operated by said motor means, said lag network providing short term stability of the pitch attitude of the craft; and an altitude signal generator additionally connected to said network, whereby said lag network opposes attitude change and thus eventual altitude change due to attitude change and thereby increases the stability of the control apparatus while under altitude control.

7. Control apparatus for an aircraft having pitch attitude changing means and motor means operating said attitude changing means, said apparatus comprising: a balanceable D.C. signal parallel summing network; a control device operated on unbalance of said network; a pitch rate D.C. signal generator; a lag network connecting said signal generator to said network; a follow-up signal generator connected to said network and operated by the motor means; further means comprising a rebalance signal generator responsive to said device; a signal storing device controlled by said rebalance signal generator and connected to said network and releasing said rebalance signal to the network for rebalance thereof; and selective means effective on rebalance of said network for providing control of said motor means by said device on subsequent unbalance of the network whereby control of said attitude changing means motor means from said network is applied without sudden operation of said attitude changing means.

8. Control apparatus for an aircraft having pitch attitude changing means and motor means and manual means alternatively operating said attitude changing means, said apparatus comprising: a balanceable D.C. signal parallel summing network operating said motor means on unbalance of said network; altitude responsive means for unbalancing said network; follow-up means responsive to displacement of said motor means, rebalancing said network; a pitch rate gyroscope signal generator responsive to rate of change of pitch attitude; and a lag network comprising two series connected resistors and a shunting capacitor connecting said rate signal generator to said network, to increase the stability of the apparatus during the altitude control of the craft.

9. Control apparatus for an aircraft having an aileron servomotor, a rudder servomotor, and an elevator servomotor, said apparatus comprising: means responsive to the change in heading of said craft operating said aileron servomotor and rudder servomotor to cause banked turn of the craft to correct for heading errors; pitch rate responsive means comprising a pitch rate axis control channel of an automatic pilot normally stabilizing the pitch attitude of the craft, but providing an undesirable signal due to the banked turn of the craft tending to cause said elevator servomotor to move the elevator in a downward direction; and further means responsive jointly to craft bank angle and craft rate of turn for opposing said undesirable signal from said pitch rate responsive means.

10. Control apparatus for an aircraft having aileron, rudder and elevator motor means, said apparatus comprising: means responsive to the change in heading of said craft operating said aileron and rudder servomotors to cause banked turn of the craft to correct craft heading; pitch rate responsive means comprising elevator motor means normally stabilizing pitch attitude of the craft but responsive to the apparent change in pitch attitude due to said banked turn to provide an unwanted signal tending to cause the elevator motor means to move an elevator in a downward direction; further means jointly responsive to craft bank angle and craft rate of turn and providing a signal opposing said unwanted signal from said pitch rate responsive means; and altitude responsive means additionally controlling said elevator motor means to maintain altitude of the craft in a banked turn.

11. Control apparatus for an aircraft having aileron, rudder, and elevator servomotors, said apparatus comprising: position detecting means responsive to the change in craft heading operating said ailerons and rudder servomotors to cause banked turn of the craft to correct for craft change in heading; pitch rate gyroscope means responsive to movement of the craft about the pitch axis operating said elevator servomotor and normally stabilizing craft pitch attitude about said axis but responsive to said apparent change in pitch attitude due to said banked turn to provide a signal tending to move said elevator servomotor in a direction to apply down elevator; and further signal providing means responsive jointly to craft bank angle and craft rate of turn for opposing said elevator servomotor operation.

12. In an automatic pilot for an aircraft having an attitude changing means and manual or hydraulic servomotor operated means positioning said attitude changing means and wherein operation of the servomotor is accompanied by operation of the manual means, said servomotor including a slidable control valve biased to unoperated position; control means operating said valve; a balanceable voltage network connected to said control means and effecting its operation on unbalance of said network; a craft pitch rate signal generator, a follow-up signal generator operated by both said servomotor and manual means; a signal generator biased to unoperated position and operatively responsive to operation of said control valve from a normal position; a signal storage means connected to said last generator while attitude changing means is manually actuated and responsive to said last named signal generator and connected along with said first two signal generators to said network to provide balance thereof while said last named signal generator and valve return to unoperated positions; and manually selective means effective on balance of said network providing control of said servomotor means by said control valve on subsequent unbalance of the network and disconnection of said storage means and last named generator whereby control of said attitude changing means servomotor from said control means is applied initially with the control valve in unoperated position.

13. Control apparatus for an aircraft having aileron and rudder servomotors, said apparatus comprising; means including a heading change responsive signal providing two part pickoff having a movable part with the craft and a fixed or stabilized part whereby heading change signals are generated on change in craft heading; control means responsive to said signals and operating said aileron and rudder servomotors to place said craft in a banked turn to correct for such heading changes; motor means for additionally adjusting said movable part relative to said fixed part of said pickoff; and further means responsive to the distance of the craft from a desired ground track and directly operating said aileron and rudder servomotors from said control means and additionally also operating said motor means at a rate dependent on said distance whereby motor displacement is in accordance with the time integral of said distance, whereby the craft will follow said ground track with operation of said motor means compensating for crosswind or like effects.

14. Control apparatus for an aircraft having aileron and rudder control surfaces with manual means and servo means operating said surfaces, said apparatus comprising: means including a heading change responsive signal pickoff having a part movable with the craft and a heading sensor positioned or fixed part whereby heading change signals are generated on change in craft heading; motor means for additionally adjusting said movable part relative to said fixed part; synchronizing means controlling said motor means from said pickoff during changes in heading effected by the manual operating means to null said pickoff; heading stabilizing means responsive to signals from said pickoff and operating said aileron and rudder servo means to maintain craft heading; and further means responsive to the distance of the craft from a chosen ground track for directly operating said heading stabilizing means and also operating said motor means at a time rate in accordance with said distance to provide the time integral of said distance to cause said craft to approach and thereafter maintain said ground track.

15. In control apparatus for an aircraft having control devices whereby the craft may be caused to bank and turn to approach and thereafter maintain a chosen ground track and motor means operating said devices, in combination: means for obtaining a first D.C. control signal proportional to the lateral displacement of the craft from the chosen ground track; means responsive to said first signal and to craft heading for obtaining a second D.C. control signal proportional to a differential mechanical displacement applied to a two-part pickoff derived from a time integral of the magnitude of said displacement signal and the operation of a heading responsive device; means for obtaining a third D.C. control signal proportional to the bank angle of the craft and signal summing means responsive to said three signals and controlling said motor means.

16. Control apparatus for an aircraft whereby the craft may be caused to change heading and thus to approach and thereafter maintain a chosen ground track defined by overlapping radio signals defining a ground track, said apparatus comprising means including a heading change responsive pickoff having a part movable with the craft and a heading stabilized or fixed part whereby heading error signals are generated on relative displacement of said parts due to change in craft heading; motor means additionally adjusting said movable part relative to said fixed part in accordance with a time integral of the error of displacement of said craft from said ground track whereby said pickoff provides a first signal proportional to the algebraic sum of the time integral of said displacement error signal and craft heading change; means for providing a second signal proportional to the displacement of the craft from a chosen ground track; means obtaining a third signal proportional to the angle of bank of the craft; and means connected to said first, second, and third signal providing means to receive said three signals so that the energy of said three signals flows therein and supplying an output proportional to the algebraic sum thereof.

17. In control apparatus for an aircraft whereby the craft may be caused to approach and thereafter maintain a chosen ground course defined by overlapping radio signals, in combination: means for obtaining a first signal proportional to the displacement of the craft from the chosen ground track; further means including a craft heading change responsive pickoff having a part rotatable with the craft about an axis and a part fixed with respect to said axis whereby heading error signals are generated by relative movement of said parts on change in craft heading about said axis; motor means additionally adjusting one part relative to said other part; control means operating said motor at a rate proportional to the displacement of the craft from the chosen ground track whereby a second signal proportional to a time integral of said displacement signal and heading error signal is obtained from said pickoff; means for obtaining a third signal proportional to the angle of bank of the craft; summing means connected to receive said first, second, and third signals; and additional means responsive to a predetermined bank angle of the craft for disconnecting said third or bank angle signal from the summing means.

18. Apparatus for stabilizing the attitude of an aircraft about an axis and permitting changes in attitude, comprising: first means producing a signal voltage varying in response to and in accordance with the attitude of said craft about said axis; manually operated means for producing an attitude control signal voltage; first servo means responsive to said first voltage for stabilizing the attitude of the craft; operable further means connected to be responsive to said manually operated means and disabling said first means to control said first servo means and enabling control of said first servo means by said manually operated means; a second servo means providing a synchronizing signal opposing said first signal and controlled by the signal of said first signal means and synchronizing signal during operation of said operable further means; said operable further means being effective on return of the manually operated means and operable further means to unoperated position to restore control of the first servo means by the signal of said first means.

19. Apparatus for controlling the heading of a craft by operation of roll attitude changing means thereof comprising: first means producing a signal voltage varying in accordance with the heading error of said craft from a desired heading; manually operable means for producing a selected heading change voltage; third means for producing a voltage varying in accordance with the bank attitude of said craft; a first servo mechanism responsive to said heading error voltage for supplying a heading stabilizing voltage; a second servo mechanism responsive to said stabilizing voltage and to said attitude voltage for operating the roll attitude changing means for stabilizing the heading of the craft; and means controlled by said manually operable means for disabling said first voltage from controlling said first servo mechanism and disabling said attitude voltage from controlling said second servo mechanism but controlling said first servo mechanism from said attitude voltage and controlling said second servo mechanism from said manually operable means; synchroning means in said first servo mechanism operated thereby for providing a signal balancing said attitude voltage during operation of said manual means; and means effective on return of said manually operable means to unoperated position but dependent upon the roll attitude being but slightly displaced from level position for rendering said attitude means again effective on said second servo mechanism.

20. Apparatus for controlling the roll attitude and heading of an aircraft, comprising: first means producing a first voltage signal varying in accordance with the bank attitude of said craft; second means producing a second voltage signal varying in accordance with changes in heading of said craft; manually operated means for producing a control voltage; a servo means responsive to said voltages from said first and second means for stabilizing the roll attitude and heading of the craft; operable further means responsive to said manually operated means and disabling said first and second means to control said servo means and enabling control thereof by said manually operated means; means connected to the first means and to the second means for nulling said first signal and second signal during operation of said further means; and additional means responsive jointly to the bank attitude of the craft and the return of said manually operated means to unoperated position for returning control of said servo means to said first and second voltage producing means.

21. Apparatus for controlling roll attitude changing means of an aircraft comprising: servo means operating said attitude changings means; control means operating said servo means; a balanceable network operating said control means; a roll attitude responsive device; a roll attitude displacement signal generator operated thereby; a roll attitude rate responsive signal generator; a servo follow-up signal generator; means connecting said three signal generators into said network; a command or control stick steering signal generator in said network for commanding a change in bank attitude; and switching means responsive to the roll attitude responsive device when the roll attitude attains a predetermined value for rendering the roll attitude displacement signal generator ineffective on said network.

22. Apparatus for selectively controlling a condition such as the position of an aircraft in accordance with a signal, said apparatus comprising: condition responsive means for detecting variations of said condition or position of the aircraft from datum and supplying a first variable signal in accordance with the magnitude and direction of position change; an amplifier connected to said responsive means and operated thereby and having circuits alternatively energized in accordance with the phase of said signal; a servo control means biased to an unoperated position and responsive to said amplifier for deriving on operation thereof a fixed magnitude signal alternatively of opposite polarity; a signal storage device connected to said servo control means and energized by said fixed signal and having an output signal increasing for a finite period; and means for supplying said increasing signal to said amplifier in opposition to said first variable signal to terminate amplifier operation whereby said amplifier circuits are no longer energized and said servo control means returns to unoperated position.

23. Control apparatus including motor means operating a condition control device such as a control surface of an aircraft for controlling a condition such as the position of the aircraft relative to datum position, in combination: a balanceable D.C. signal summing network having a plurality of sources of signals constituting input signals and having network output members; means including a condition responsive device such as a device responsive to change in said position operating one said source for unbalancing said network; movable means connected to the network output members and displaced from a normal position on unbalance of said network, and returned on rebalance of said network; a D.C. trim signal source having a connection to said network and operated by said movable means for rebalancing said network; means in said connection effective to maitain balance of said network despite return of said movable means to said normal position; selective means rendering said network effective on said motor means; manual selective means for operating another source of signal in said network; and means controlling said motor means from said network in accordance with the operation of said manual means.

24. A craft control system comprising means automatically operable for controlling the bank angle of said craft, means manually operable for controlling the bank angle of the craft, means for rendering said automatically operable means ineffective on said craft when said manually operable means is operated, and switching means responsive to the bank angle of the craft for causing said automatically operable means to return the craft to a level bank angle when said manually operable means is released if the bank angle has not exceeded a predetermined angle and for causing said automatically operable means to maintain the existing angle if said predetermined angle is exceeded.

25. In a control system for a craft, means for selectively rendering said system effective and ineffective to control said craft, and means responsive to the displacement of the craft with respect to a level flight attitude about the roll axis at the time said control system is rendered effective for maintaining said craft in the displaced attitude existing at the said time when said displacement exceeds a predetermined amount and for maintaining said craft on a heading corresponding to the heading of the craft at the said time when said displacement does not exceed said predetermined amount.

References Cited by the Examiner

UNITED STATES PATENTS

| | | | |
|---|---|---|---|
| 2,415,429 | 2/1947 | Kellogg et al. | 244—77 |
| 2,471,821 | 5/1949 | Kutzler et al. | 244—77 |
| 2,686,022 | 8/1954 | Hanna et al. | 244—77 |
| 2,731,217 | 1/1956 | Noxon et al. | 244—77 |
| 2,740,082 | 3/1956 | Sedgfield | 244—77 |
| 2,759,137 | 8/1956 | Kutzler | 318—489 |
| 2,808,999 | 10/1957 | Chenery | 244—77 |
| 2,877,967 | 3/1959 | Markusen | 244—77 |

FERGUS S. MIDDLETON, *Primary Examiner.*

CHARLES F. GAREAU, MILTON BUCHLER, EMILE PAUL, *Examiners.*